July 11, 1967    W. P. LEAR ET AL    3,331,005
BRUSHLESS D.C. MOTOR
Filed March 16, 1964    7 Sheets-Sheet 1

INVENTORS
WILLIAM P. LEAR
SAMUEL H. AULD

July 11, 1967    W. P. LEAR ET AL    3,331,005
BRUSHLESS D.C. MOTOR
Filed March 16, 1964    7 Sheets-Sheet 2

INVENTORS
WILLIAM P. LEAR
SAMUEL H. AULD

July 11, 1967
W. P. LEAR ET AL
3,331,005
BRUSHLESS D.C. MOTOR
Filed March 16, 1964
7 Sheets-Sheet 3
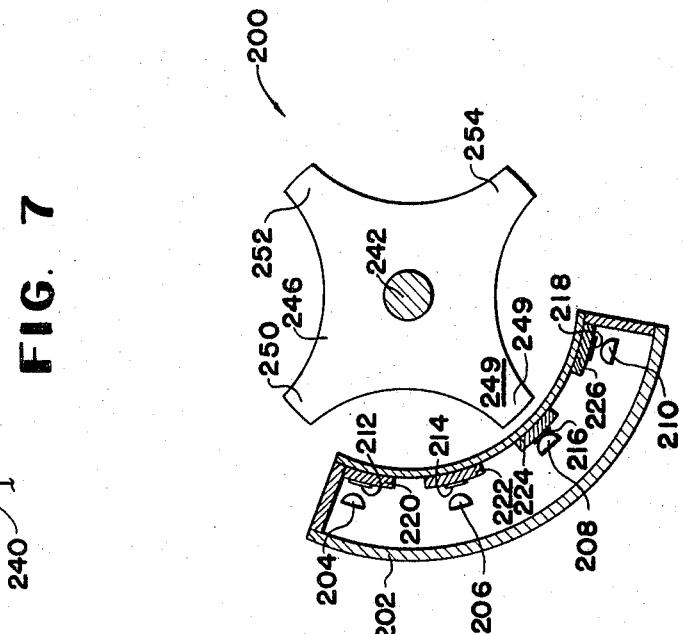
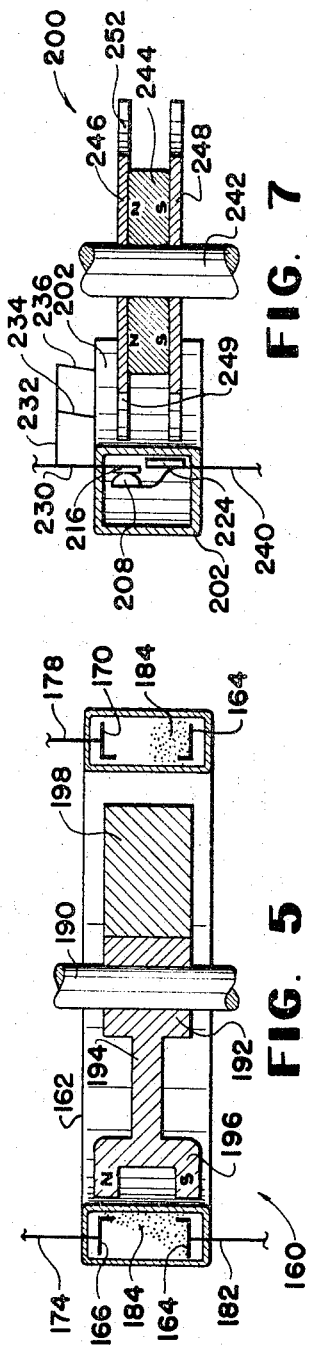
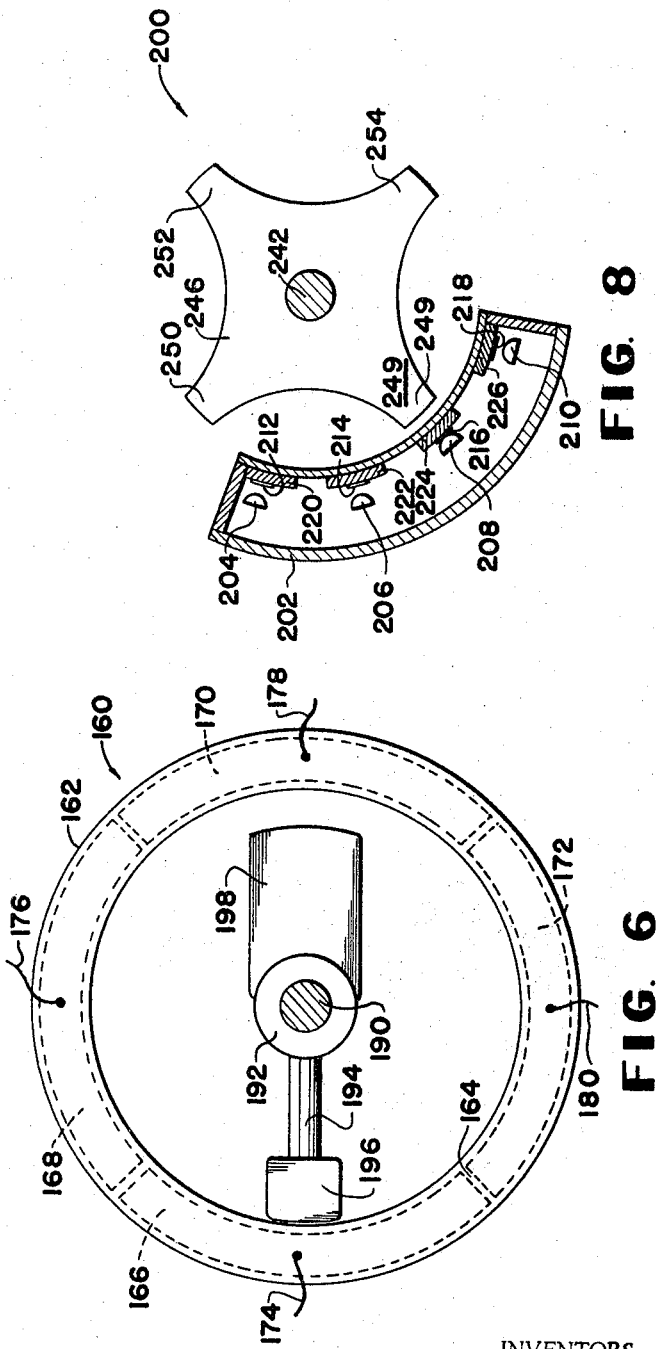
INVENTORS
WILLIAM P. LEAR
SAMUEL H. AULD

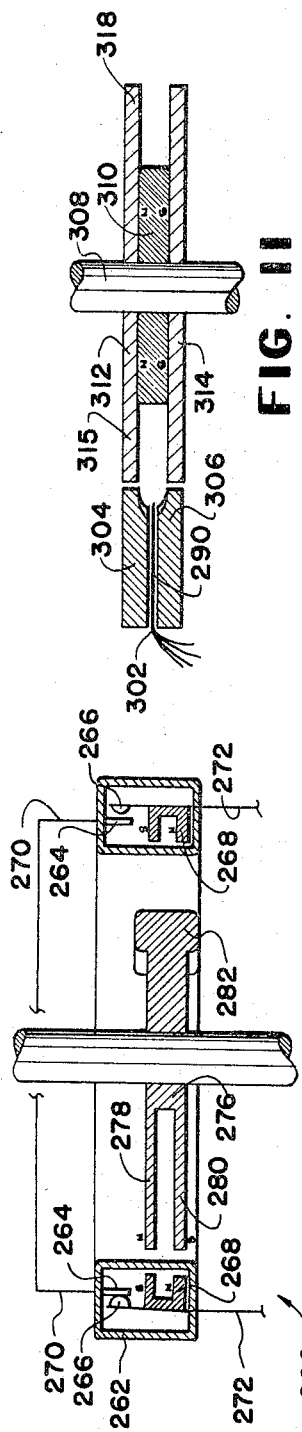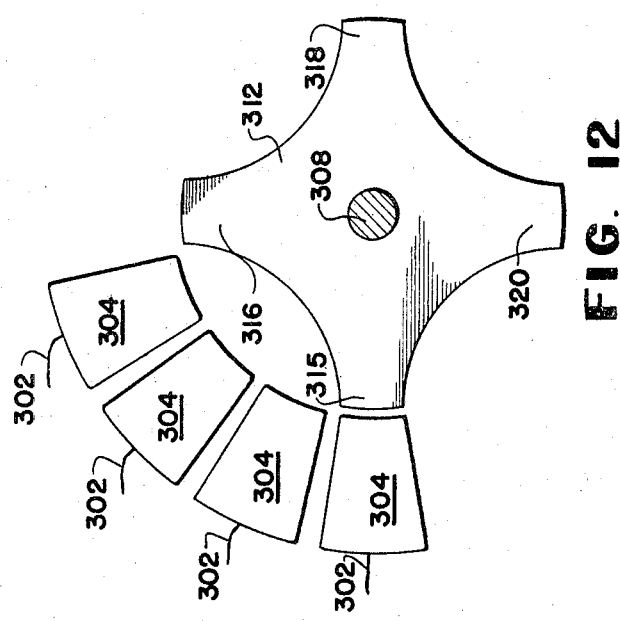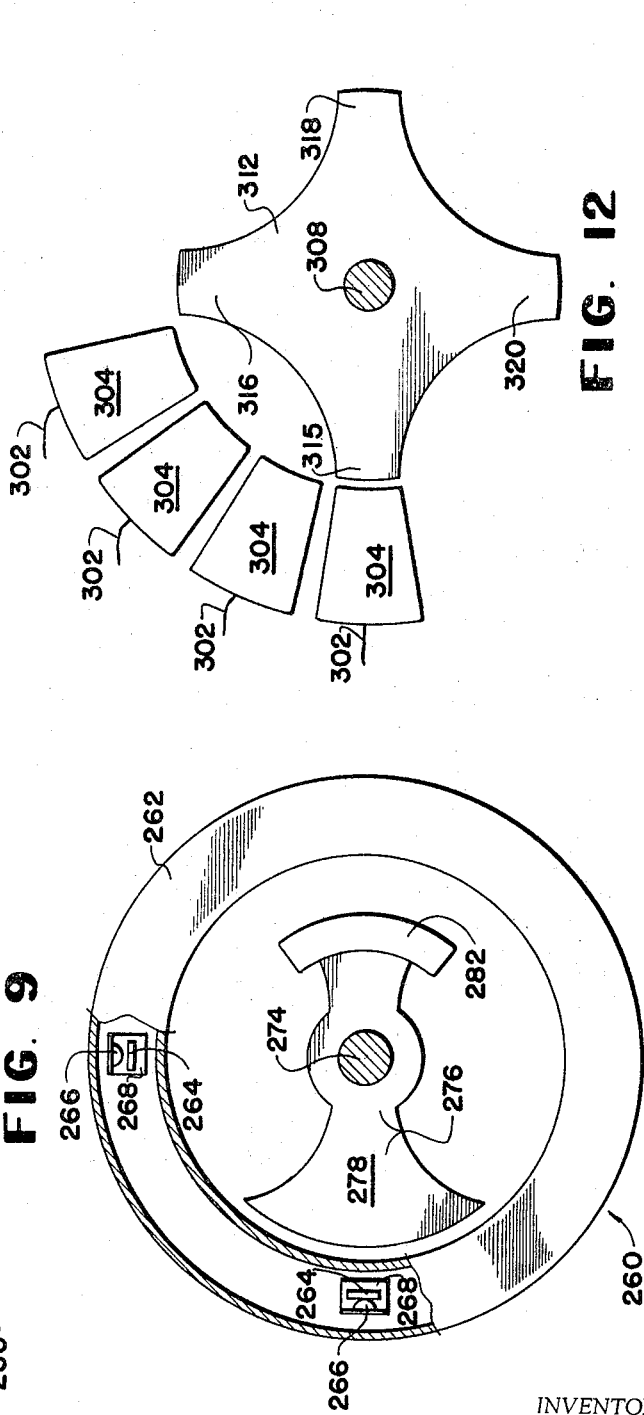

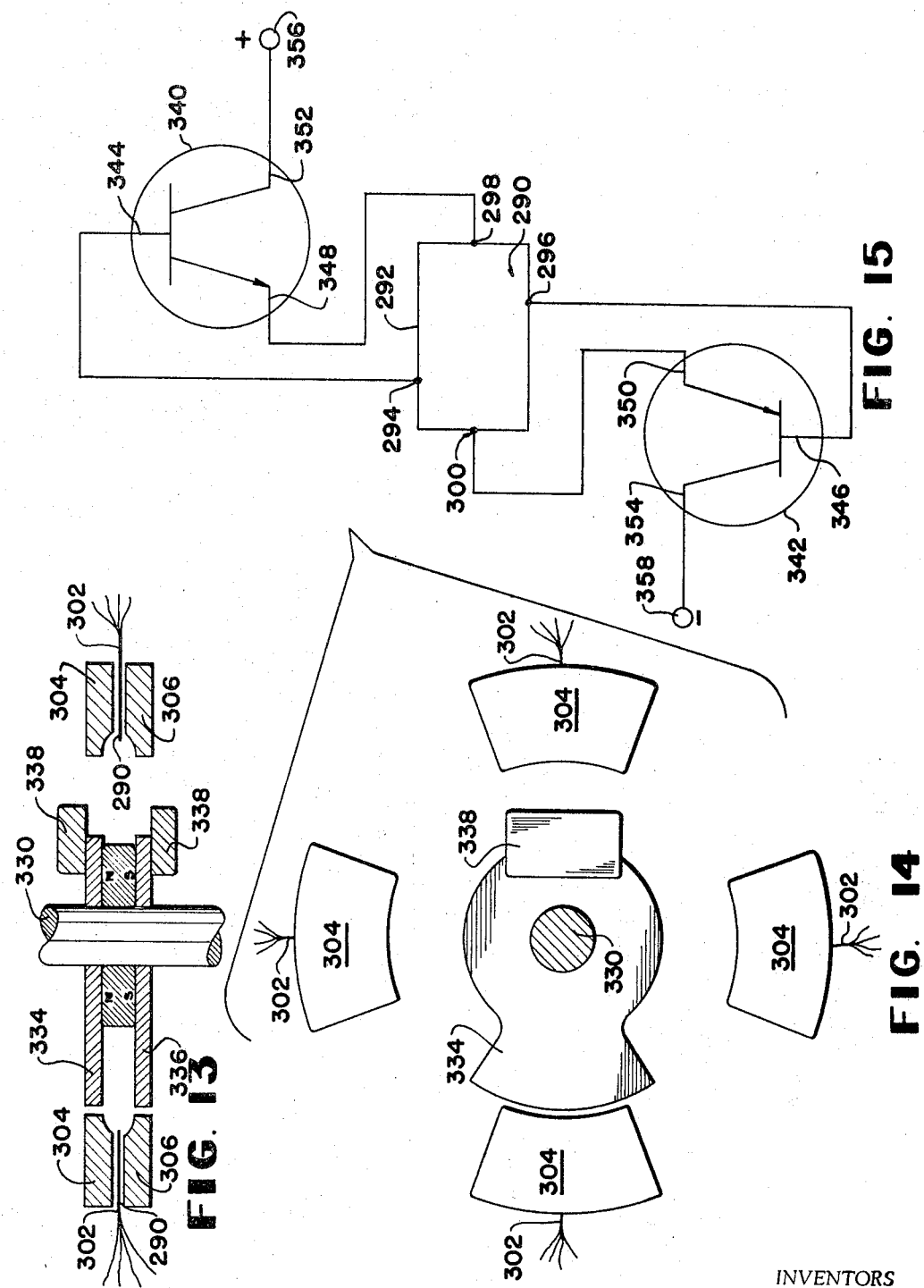

July 11, 1967 W. P. LEAR ET AL 3,331,005
BRUSHLESS D.C. MOTOR
Filed March 16, 1964 7 Sheets-Sheet 6

INVENTORS
WILLIAM P. LEAR
SAMUEL H. AULD

INVENTORS
WILLIAM P. LEAR
SAMUEL H. AULD

United States Patent Office 3,331,005
Patented July 11, 1967

3,331,005
BRUSHLESS D.C. MOTOR
William P. Lear and Samuel H. Auld, Wichita, Kans., assignors to Lear Jet Corporation, Wichita, Kans., a corporation of Delaware
Filed Mar. 16, 1964, Ser. No. 351,983
6 Claims. (Cl. 318—254)

This invention relates to direct current motors and, in a more specific aspect, to brushless D.C. motors. Still more specifically the invention relates to D.C. motors which are constructed without the usual commutator and brushes. In another aspect the invention relates to contactor means usable with a brushless D.C. motor for performing the function of the brushes and providing a rotating magnetic field. In another aspect the invention relates to contactor means constructed and adapted for use with a brushless D.C. motor or for other applications where sequential electrical switching is desired.

Various constructions of direct current motors are known to the art. The typical prior art D.C. motor includes a commutator and brushes to in operation provide a rotating magnetic field for operation of the motor. The presence of commutator and brushes is undesirable in many instances and thus limits the uses of D.C. motors. The life of the brushes of the typical D.C. motors is relatively short and the drag or friction from the brushes in operation is undesirable in many applications. In addition, some sparking ordinarily occurs during operation of the motor as a result of the presence of the brushes and such is undesirable and makes D.C. motors unusable in the presence of combustible fuels or vapors therefrom and in other explosive atmospheres and in addition prohibits use of D.C. motors in some space applications. While the use of D.C. motors is limited or prohibited in view of the foregoing considerations in many applications, D.C. motors are more desirable than comparable A.C. motors since they normally provide greater performance for a given size and weight and D.C. voltage is sometimes available where A.C. voltage is not available. For these reasons it is desirable to provide a D.C. motor wherein the undesirable features resulting from use of commutator and brushes is eliminated.

In accordance with the present invention brushless D.C. motors are provided which include a housing and a rotor positioned in the housing and having a magnetic member therewith. An armature is provided and located in the housing and preferably includes a plurality of conductors. Contactor means having electrical contact means electrically connected to the conductors of the armature and connectible to a source of electrical energy are provided and the contractor means includes means associated with the electrical contact means operable to close same for the passage of electrical energy to the conductors and thereby create a magnetic field to cause rotation of the rotor.

The invention further provides contactor means for use with a brushless D.C. motor or for other applications where electrical switching is desired. The contactor means of the invention includes a plurality of electrical contact means having means associated therewith to electrically open and close a circuit between said contact means. The contactor means additionally includes means to selectively cause movement of said means associated with the electrical contacts to make and break the circuit therebetween at the desired time.

Accordingly, it is an object of the invention to provide new brushless D.C. motor means wherein the usual brushes of the prior art D.C. motors have been eliminated.

Another object of the invention is to provide a new brushless D.C. motor wherein sparking in the atmosphere resulting from operation of the motor is eliminated to thereby permit application of the motor in explosive atmospheres and in other applications where D.C. motors incorporating brushes which spark are not usable.

Another object of the invention is to provide a new D.C. motor having contactor means associated with windings of the motor and operable to provide a rotating magnetic field for operation of the motor.

Another object of the invention is to provide a new brushless D.C. motor having contactor means associated therewith to provide a rotating magnetic field to the motor and wherein the contact means includes a rotatable member operatively connected to a shaft for movement therewith with the rotatable member sequentially operating switch means to open and close circuits between a source of D.C. power and the motor to provide the rotating magnetic field of the motor.

Another object of the invention is to provide new contactor means to operate switch means.

Another object of the invention is to provide new contactor means for a brushless D.C. motor or the like wherein the contactor means is constructed and adapted to sequentially operate switch means and thereby open open and close electric circuits.

Another object of the invention is to provide new contactor means having electrical contacts including means influenced by a magnetic field to open and close a circuit between the contacts.

Another object of the invention is to provide new contactor means having magnetic means associated therewith for opening and closing switches and magnetic means movably mounted relative thereto to control operation of the switches.

Another object of the invention is to provide new contactor means utilizing photoelectric devices for opening and closing switch means of the contactors.

A further object of the invention is to provide new contactor means utilizing Hall generator devices for opening and closing electrical circuits.

A further object of the invention is to provide new contactor means which are constructed and adapted to simultaneously open and close a plurality of switches.

A still further object of the invention is to provide new contactor means for use with a D.C. motor or the like wherein the contactor means includes an element effected by a magnetic field and wherein the element is positioned relative to magnetic means with the rotor of the motor so that operation of the rotor controls operation of the contactor means.

Another object of the invention is to provide new contactor means for use with a D.C. motor or the like wherein the contactor means includes generator means and has means associated therewith for operation of the generator means.

Various other objects, advantages, and features of the invention will become apparent to those skilled in the art from the following description taken in conjunction with the accompanying drawings in which:

FIG. 5 is a cross section view illustrating another preferred specific embodiment of the contactor means of the invention.

FIG. 6 is a plan view of the contactor means of FIG. 5.

FIG. 7 is a cross section view illustrating a further preferred specific embodiment of the contactor means of the invention.

FIG. 8 is a cross section view through the housing of the contactor means of FIG. 7.

FIG. 9 is a transverse cross section view illustrating another preferred embodiment of the contactor means of the invention.

FIG. 10 is a plan view, partially broken away, illustrating the contactor means of FIG. 9.

FIG. 11 is a transverse cross section view illustrating a still further preferred specific embodiment of the contactor means of the invention wherein Hall generator means are used.

FIG. 12 is a plan view of the contactor means of FIG. 11.

FIG. 13 is a transverse cross sectional view showing another preferred specific embodiment of the contactor means of the invention utilizing Hall generator means.

FIG. 14 is a plan view of the contactor means shown in FIG. 13.

FIG. 15 is a diagrammatic view of an electric circuit utilizing one of the Hall generator means of the embodiments of FIGS. 11–14.

FIG. 24 is a transverse cross sectional view illustrating a still further preferred specific embodiment of the contactor means of the invention for use with D.C. motors or the like.

Figure 1:
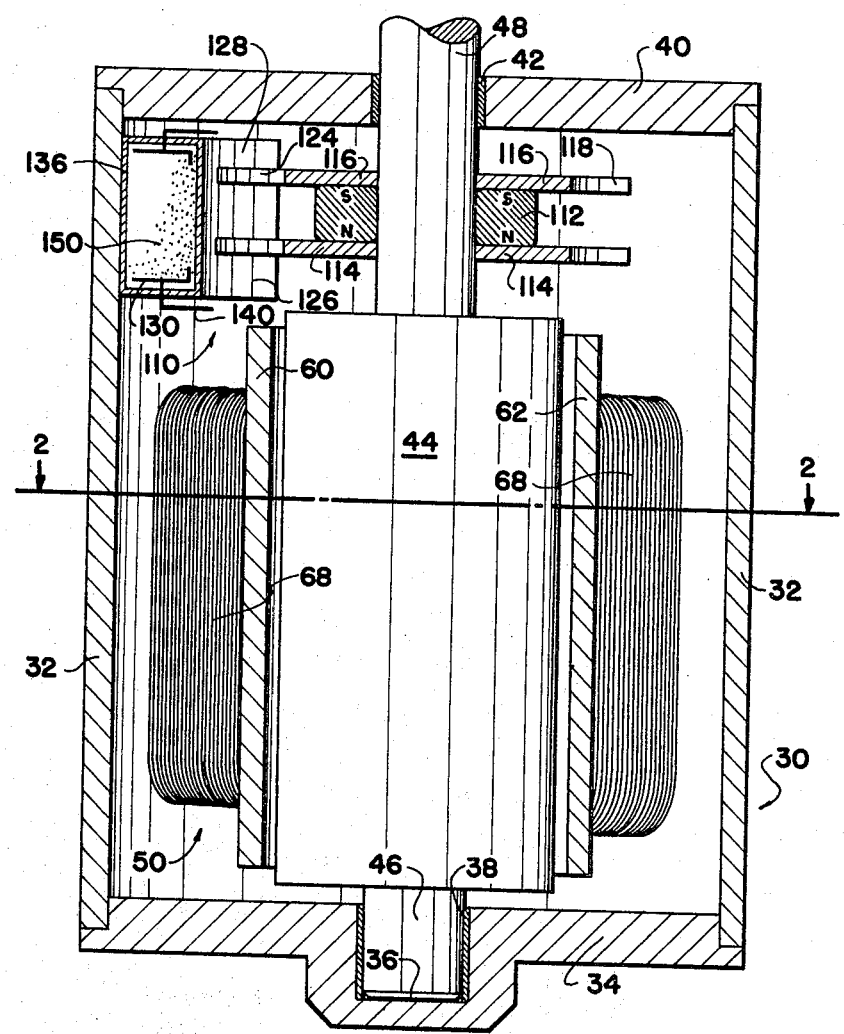
FIG. 1 is a longitudinal cross section view through a preferred specific embodiment of a brushless D.C. motor of the invention.

The following is a discussion and description of preferred specific embodiments of the new brushless D.C. motor of the invention and of contactor means for use with D.C. motors or the like of the invention, such being made with reference to the drawings whereon the same reference numerals are used to indicate the same or similar parts and/or structure. It is to be understood that discussion and description is not to unduly limit the scope of the invention.

Referring now to the drawings in detail and to FIGS. 1–4 in particular, a preferred specific embodiment of the invention is shown generally at 30 and preferably includes an elongated hollow and generally cylindrical motor housing 32. The housing 32 includes a lower end plate 34 which has a recess 36 therein which preferably receives suitable bearing means 38 and another end plate 40 is provided which is mounted on the other end portion of the housing portion 32 and receives a bearing member 42. An elongated rotor is provided which includes a magnetic member 44 which can be a cylindrical permanent magnet or such can be a wound member to provide the desired magnetic poles. Shaft members 46 and 48 are operatively connected to the magnet 44 and the shaft 46 is rotatably mounted in bearing 38 and shaft 48 is rotatably mounted in the bearing 42 and desirably projects through the end plate 40 so that power can be taken from the motor.

Figure 3:
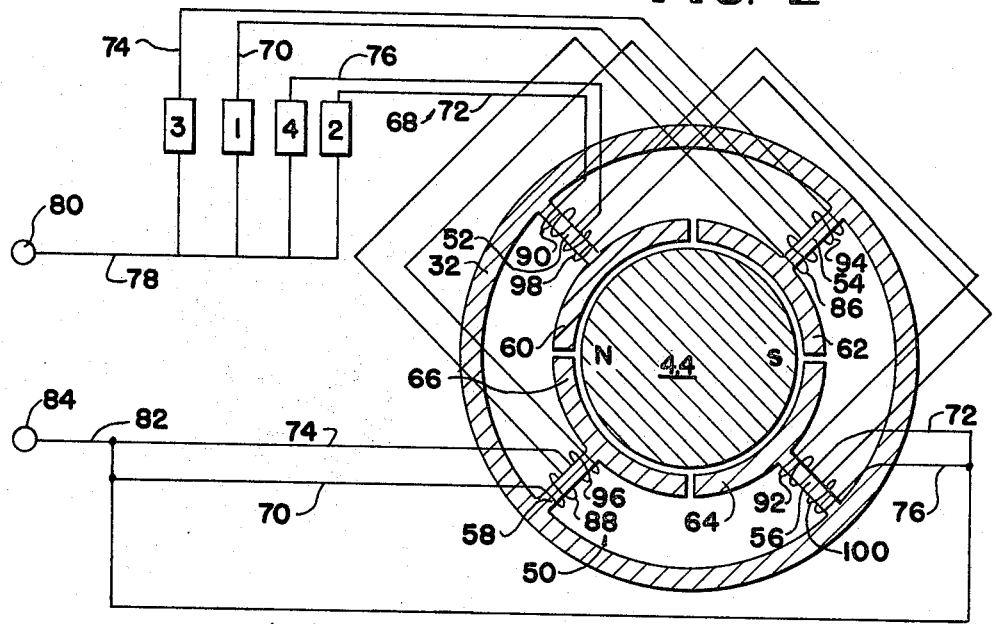
FIG. 3 is a diagrammatic view illustrating portions of the motor of FIG. 1 and showing connection of the contactor means to provide electrical switching.

A stationary armature is provided as shown generally at 50 and in the embodiment shown in the drawings the armature is positioned around the magnet 44 and includes four spaced supports 52, 54, 56 and 58 which extend longitudinally in the housing and are spaced substantially a quadrant apart from adjacent ones of the supports. The supports can be provided with arcuate, longitudinally extending inner portions as shown at 60, 62, 64 and 66, respectively. Connected to the supports 52, 54, 56 and 58 are a plurality of windings of electrical conductors which are shown generally at 68. The number of poles provided for a given motor and the number of conductors wound thereon and the manner of winding same is variable and the construction illustrated in the drawings is for a four pole D.C. motor. For the four pole motor shown in the drawings four separate electrical conductors 70, 72, 74 and 76 are preferably provided and such are best illustrated in FIG. 3. One end of each of the conductors 70, 72, 74 and 76 is electrically connectible to a conductor 78 which is connectible to a terminal 80 of a source of D.C. power and the other end portions of the conductors are connectible to a conductor 82 which is connected to the other terminal 84 of the source of D.C. power.

Preferably, each of the conductors 70, 72, 74 and 76 are wound on two diametrically opposite ones of the supports 52, 54, 56 and 58 and preferably each conductor is oppositely wound on two supports. For example, the conductor 70 has a first winding 86 on support 54 and a second winding 88 on support 58. The windings 86 and 88 are wound the reverse of each other. Likewise the conductor 72 has a winding 90 on support 52 and another winding 92 on support 56 and the windings 90 and 92 are also the reverse of each other. The conductor 74 has a winding 94 on support 54 and another winding 96 on the support 58 and the windings 94 and 96 are the reverse of each other. The fourth conductor 76 has a winding 98 on support 52 and another winding 100 on support 56 which are wound in the reverse or opposite manner on the supports. With the conductors positioned on opposite supports and being wound in the manner described, passage of D.C. energy through the conductors will produce diametrically opposite magnetic poles. For example, when energy is supplied to conductor 70 the energy flows through coils or windings 86 and 88 on supports 54 and 58 to provide a magnetic field within the motor housing and as electricity is alternately provided to the conductor 70, then to conductor 72, then to conductor 74 and finally to conductor 76, such produces a rotating magnetic field which acts on the magnetic member 44 of the rotor to cause rotation of same and thereby rotate the shaft 48.

In order to create the desired rotating magnetic field to cause rotation of the magnetic member 44, means are provided for alternately supplying electrical energy to conductors 70, 72, 74 and 76 and we call such means contactor means. The contactor means can be considered to be switches and are constructed and adapted to close and open sequentially in the order indicated in FIG. 3 by the numbered boxes connected to the conductors 70, 72, 74 and 76. Various contactor means capable of providing the desired switching function to produce a rotating magnetic field are shown in the drawings and one embodiment thereof is best illustrated in FIGS. 1 and 4.

Figure 4:
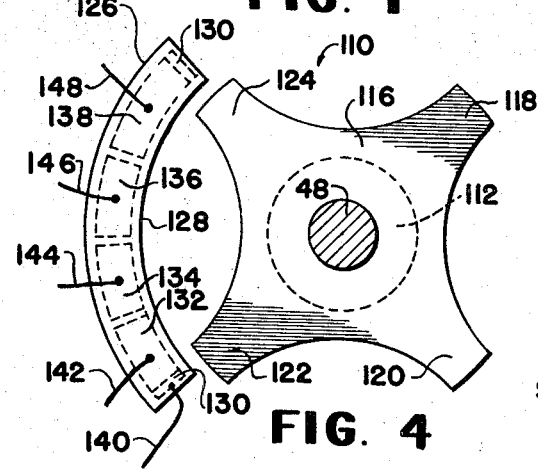
FIG. 4 is a plan view showing the contactor means illustrated with the motor of FIG. 1.
Figure 2:
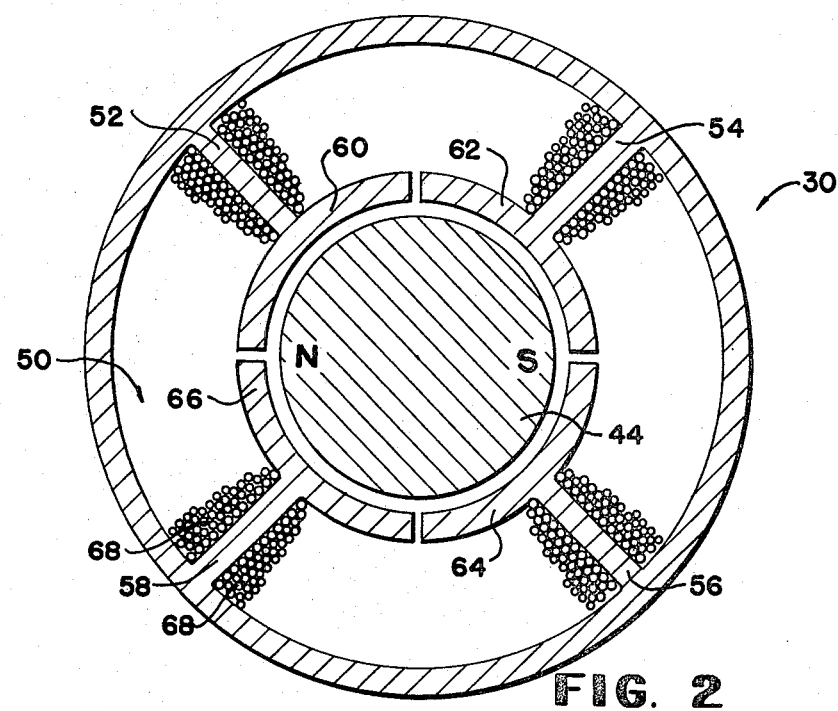
FIG. 2 is a transverse cross section view taken along the line 2—2 of FIG. 1.

The contactor means of FIGS. 1 and 4 is shown generally at 110 and preferably includes an annular permanent magnet 112 and two spaced flat pole pieces 114 and 116 which are in engagement with opposite end faces of the magnet 112 and project radially therefrom with the magnet and the pole pieces being operatively connected to a shaft for rotation therewith. As illustrated in FIG. 1, the magnet and pole pieces can be operatively connected to the shaft 48 of the motor or, if desired, such can be connected to a shaft which is geared or otherwise operably connected to shaft 48 and, in some instances, it may be desirable to mount the contactor means on a completely separate shaft. For example, the contactor means for the motor can be mounted on a shaft of a separate motor or on a shaft of a machine or vehicle so that operation of the machine or vehicle provides the rotation for the magnet 44. Each of the pole pieces or members 114 and 116 have a plurality of projecting arms and, for a four-pole motor and when the contactor housing is a quadrant of a circle then the pole pieces preferably have four radially projecting arms positioned approximately 90 degrees apart. The arms of the pole piece 116 are shown at 118, 120, 122 and 124 in FIG. 4 and it will be understood that the pole piece 114 is of like construction. The arms of the pole pieces are axially in line with each other and positioned in overlying relation when viewed as in FIG. 4. The number of poles provided and spacing thereof can be varied to suit the desired motor construction and is coordinated with other structure of the contactor means.

An elongated and preferably a closed arcuate housing 122 is provided and is positioned in housing 30 or otherwise located relative to the shaft 48 and the pole pieces 114 and 116 so that the inner wall 128 of the housing 126 is closely adjacent the outer end portions of the arms of the pole pieces 114 and 116 during rotation of the shaft. Thus, the pole pieces 114 and 116 and the magnet 112 provide a magnetic field in the housing 126 and the magnetic field rotates or moves during rotation of the pole pieces. When four separate arms are provided on the pole pieces, then each revolution of the shaft mounting the pole pieces causes four passes of a magnetic field through the housing 126.

An elongated common electrical contact 130 is positioned in the housing 126 and preferably is of sufficient length to extend substantially the entire length of the housing and as illustrated in FIG. 4, the ends of the common contact 130 are adjacent the ends of the housing.

A plurality of individual electrical contacts are provided and for the four pole motor described four spaced individual electrical contacts 132, 134, 136 and 138 are provided and such are desirably located in the upper portion of the housing 126 while the common contact 130 is preferably at the bottom of the housing. A conductor 140 is connected to the common contact 130 and conductors 142, 144, 146 and 148 are connected to the individual contacts 132, 134, 136 and 138, respectively, and conductor 140 can be connected to the conductor 78 of FIG. 3 or directly to terminal 80, or the source of D.C. energy and the conductors 142–148 can be the conductors 70, 72, 74, and 86, respectively.

Means are preferably provided with the contactor means 110 to alternately close an electrical circuit between the common contact 130 and the individual contacts 132, 134, 136 and 138. One means for accomplishing this is illustrated in FIG. 1 of the drawings where a quantity of powdered iron or other metallic material is shown at 150 and is positioned within the housing 126 and normally rests on the contact 130 and is spaced from the contacts 132, 134, 136 and 138. When one of the arms of the pole members 114 and 116 is in close proximity to the housing 126, then the portion of the powdered iron 150 adjacent the pole pieces will be in a magnetic field which causes displacement of the iron or other particles 150 to the position illustrated in FIG. 1 of the drawings and an electrical circuit is thereby completed from the lower contact 130 to one of the upper contacts. As the shaft 48 continues to rotate and the arms of the pole pieces are moved then others of the individual contacts are sequentially placed in electrical contact or in an electrical circuit with the common contact 130. Thus, rotation of the shaft 48 causing movement of a magnetic field through the housing 126 sequentially operates what may be called switch means and as a result electrical energy can be provided from a source of D.C. energy through conductor 140 and alternately supplied to a plurality of individual conductors, such as the conductors 142–148 which can be directly or indirectly connected to the conductors 70, 72, 74 and 76 to thus provide a rotating magnetic field for operation of the motor 30.

By making the housing 126 substantially a quadrant or about 90 degrees and by providing four arms on the pole pieces, at least one of the poles or arms of the pole pieces is always positioned relative to the housing 126 so that electrical energy is alwaye provided through the common contact to one of the individual contacts within the housing so that the motor can be started or stopped by closing or opening the circuit from the conductor 140 to the source of D.C. power. Fewer pole pieces or arms can be provided on the members 114 and 116 by lengthening or extending the housing 126 and extending the length of each of the individual contacts 132–138 mounted therein. For example, a single pole or arm member can be provided on the pole pieces and the housing 126 would then be made annular in shape and each of the individual contacts 132–138 would then extend approximately 90 degrees around the housing. The same electrical switching or operation would be obtained by the contactor means. When motors with additional poles are desired, then the number of individual contacts in the housing will be increased.

A modification of the contactor means of the invention is illustrated in FIGS. 5 and 6 and this embodiment is shown generally at 160. The contactor means 160 includes an annular closed housing 162 and a common electrical contact 164 is positioned within the housing and preferably is annular in shape and extends entirely around the housing. A plurality of individual electrical contacts are provided and are positioned in an upper portion of the housing in longitudinal spaced relation to each other and in transverse spaced relation to the common contact 164. As illustrated in the drawings, four individual electrical contacts 166, 168, 170 and 172 are provided, four of the individual contacts being used for a four pole motor. The individual contacts 166–172 are connectible by conductors 174, 176, 178 and 180, respectively, to a plurality of conductors forming windings in the motor, such as the conductors 70, 72, 74 and 76, respectively, of FIG. 3. The common electrical contact is connectible by a conductor 182 to a terminal of a source of D.C. power, such as to the terminal 80 in FIG. 3. A quantity of magnetically movable material, such as a powdered metal such as powdered iron, is shown at 184 and the iron particles 184 extend around the housing and normally rest on the common contact 164 and when moved by a magnetic field the powdered iron or other material 184 moves to the position shown on the left side of FIG. 5 to thereby provide a path for passage of electrical energy between the common contact 164 and the individual contacts, such as the individual contact 166 as shown in FIG. 5.

A shaft 190 is positioned within the annular housing 162 and is preferably concentric or coaxial therewith and the shaft 190 can be the motor shaft or a separate shaft as explained hereinbefore. A magnet mounting member 192 is provided and has a portion thereof connected to the shaft 190 and includes an arm 194 projecting radially outwardly therefrom. A magnet 196, preferably a U-shaped permanent magnet, is provided and is mounted on the outer end portion of the arm 194 in any suitable manner and desirably the arms or projecting portions of the U-shaped magnet are positioned adjacent the upper and lower portions of the housing 162 as best illustrated in FIG. 5 so that movement of the magnet around the housing provides a magnetic field through the housing in a transverse direction to cause displacement of the iron or other particles 184 as illustrated in FIG. 5. Preferably, a weight or the like 198 is connected to the magnet mounting means diametrically opposite from the magnet 196 and balances the shaft 190 for the weight of the magnet.

Another preferred specific embodiment of contactor means for closing circuits and usable with the motor of the invention is shown generally at 200 in FIGS. 7 and 8 and includes an elongated closed arcuate housing 202. Positioned within the housing 202 are a plurality of electrical contact means which as illustrated in the drawings includes contact members 204, 206, 208 and 210 which are engageable with electrical contacts 212, 214, 216, and 218, respectively. The contacts 204, 206, 208 and 210 as shown in the drawings are movable contacts and each can have associated therewith a pole piece as shown at 220, 222, 224 and 226 so that when a magnetic field is provided through housing 202 the pole pieces will assist in moving the contacts 204, 206, 208 and 210 radially inwardly into engagement with the contacts mounted on the radially inner portion of the housing. The inner contacts 212, 214, 216 and 218 can be considered as common contacts and can be electrically interconnected in any suitable manner. This electrical interconnection is illustrated in FIG. 7 where a conductor 230 is connected to the contact 216 and conductors 232, 234, and 236 are connected through the housing 202 to the contacts 212 and 214. The radially inner or common contacts are connectible to a source of D.C. power and the movable contacts are connectible by suitable conductors such as shown at 240 in FIG. 7 for contact 208 to a plurality of conductors, such as the conductors making up the windings of a D.C. motor as shown in FIGS. 1–4.

A suitable shaft 242 is provided and is positioned relative to arcuate housing 202 to be coaxial therewith and the shaft 242 can be a motor shaft or other suitable shaft. An annular magnet 244 is positioned around shaft 242 and upper and lower pole pieces 246 and 248 are in abutting engagement with the annular magnet 244 and the pole pieces are operatively connected to the shaft 242 for rotation therewith. The pole pieces 246 and 248 preferably have arms or projecting members therewith and the number of arms depends upon the number of poles and the size or dimension of the housing 202. As illustrated in FIG. 8, four poles 249, 250, 252 and 254 are provided on pole piece 246 and the pole piece 248 has a like number of the arms or poles.

The shaft 242 and the pole pieces 246 and 248 are positioned relative to the housing 202 so that the outer end portion of the arms 249, 250, 252 and 254 are positionable adjacent the radially inner surface of the housing 202 and in operation as the shaft 242 rotates and the outer ends of the arms of pole pieces pass close to the housing 202, a magnetic field is provided in the housing 202 which operates the sets of contacts therein to alternately close and open the contacts so that electrical energy is provided from the common or inner contacts to separate ones of the outer contacts and then to a plurality of conductors which can be windings of a D.C. motor or the like.

Another preferred specific embodiment of contactor means for closing circuits and usable with the D.C. motors of the invention is shown generally at 260 in FIGS. 9 and 10 and includes an annular closed housing 262. A plurality of fixed electrical contacts 264 can be provided and mounted in an upper portion of the housing 262 and a plurality of movable contacts 266 can be mounted in the lower portion of the housing. The contacts 266 of each of the sets of contacts are preferably positioned radially outwardly from the fixed contacts 264 and are movable in a radial direction into and out of engagement with the fixed contacts 264. Suitable magnetic means are preferably utilized in connection with the movable contacts 266 to cause movement thereof. As illustrated in the drawing, a plurality of generally U-shaped magnets 268 are provided and are connected to the movable contacts 266 and are located beneath the fixed contacts 264 with the outermost ends or poles thereof being adjacent the radially inner edge or wall of the housing 262 when the contacts are in engaged position. The fixed contacts 264 are connectible to a source of D.C. power or to suitable conductors through conductors 270 and in a similar manner the movable contacts 266 are connectible to either a source of D.C. power or to windings in a motor or the like by conductors 272.

A rotatable shaft 274 is concentrically positioned within the housing 262 and can be a motor shaft or driven from other suitable means. A generally U-shaped magnet 276 is operatively connected to the shaft 274 and includes upper and lower pole members 278 and 280 which project outwardly from the shaft and have the outer end portions thereof positioned adjacent the inner wall of the housing 262 and preferably the magnet 276 is mounted so that the north and south poles thereof are positioned opposite from the poles of the magnet 268 as illustrated in FIG. 9. The circumferential width of the magnet 276 is preferably substantially a quadrant or 90 degrees when four sets of contacts are mounted in the housing 262 and the width can be varied depending upon the number of contacts involved, the arcuate dimension of the housing 262, etc. A counterbalance weight 282 can be provided if desired and operatively connected to the shaft 274 and positioned substantially diametrically opposite from the magnet 276 so that shaft 274 is balanced for the weight of the magnet during the rotation of the shaft.

In operation, rotation of shaft 274 places the poles 278 and 280 of magnet 276 in close relation to the inner wall of the housing 262 to thereby provide a rotating magnetic field to the housing and as the magnetic field passes the magnets 268 attached to movable contacts 266, the magnets are moved toward the inner wall of the housing 262 to thereby make an electrical contact between the movable contact 266 and the fixed contact 264 to thereby close an electrical circuit which can be used to provide D.C. energy from a source of D.C. power to windings of a motor or the like such as shown in FIGS. 1–4 and thereby control operation of the D.C. motor. If desired, the movable contacts 266 can be mounted radially inwardly in the housing relative to the fixed contacts 264 and in such case the magnets 268 would be positioned so that the poles thereof are opposite from like poles of the magnet 276 so that rotation of the magnet 276 repels the magnets 268 and thus moves the movable contacts 266 radially outwardly in housing 262 and into engagement with contact 264.

FIGS. 11–15 illustrate contactor means of the invention which embody electrical generator means commonly called Hall generators. The Hall generators are shown generally at 290 and as diagrammatically indicated in the figures, the typical Hall generator includes a thin wafer of a suitable semi-conductor material as shown at 292 in FIG. 15 and any suitable semi-conductor material known to the art can be used, such as indium antimonide. The Hall generators have signal terminals 294 and 296 located at opposite portions of the wafer 292 and a bias input terminal 298 and a bias output terminal 300 are also provided and are located at substantially opposite portions of the member 292 and are located between the signal terminals 294 and 296. A magnetic field can be passed transversely through the material or wafer 292, that is in a direction perpendicular to the wafer 292 as shown in FIG. 15, and the flux passes through the wafer in its thinnest dimension and as a result a voltage appears at the signal terminals 294 and 296. The voltage thus generated can be utilized to operate contactor means.

FIGS. 11 and 12 of the drawings illustrate one preferred specific embodiment of contactor means using the Hall generators 290. In FIGS. 11 and 12 a plurality of the Hall generators are positioned in an arcuate path and four of the Hall generators are shown in the embodiment of FIGS. 11 and 12, the conductors connected to the signal and bias terminals of the generators being shown generally at 302. A plurality of upper and lower pole pieces 304 and 306, respectively, of a magnetizable material are provided and are positioned on opposite sides of the wafers of the Hall generators 290 in close fitting relation thereto so that a magnetic field can be provided between the pole pieces and through the Hall generator 290.

A rotatable shaft 308 is provided and an annular magnet 310 is positioned around the shaft and pole pieces 312 and 314 are positioned in engagement with the axial ends of the magnet 310 and the pole pieces and the magnet are operatively connected to the shaft 318 for rotation therewith. The pole piece 312 has arm members or portions 315, 316, 318 and 320 projecting therefrom with the outer ends thereof being adjacent to the upper pole pieces 304 and the lower pole piece or member 314 connected to the shaft 308 also has like arm members or poles projecting therefrom and such are positioned in axial alignment with the upper pole piece 312 and are adjacent the lower pole pieces 306.

In operation, shaft 308 when rotated moves the magnet 310 and the pole pieces 312 and 314 with the arm portions of the members 312 and 314 being closely adjacent the pole pieces 304 and 306 to magnetize same and thereby provide a magnetic field or flux therebetween which passes through the wafer of the Hall generator 290. Thus, a signal voltage is generated at terminals 294 and 296 of the Hall generator in FIG. 15 and are utilized as explained hereinafter to operate a circuit, it being understood that each of the Hall generators acts to open and close a circuit to a conductor or the like from a source of power so that same can be utilized to control flow of electrical energy to one of the conductors forming the windings of the motor of the invention, such as the motor of FIGS. 1–3.

In FIGS. 13 and 14 the Hall generators 290 are positioned between upper and lower pole pieces 304 and 306 and conductors 302 are connected to the signal and bias terminals of the generators 290 in the manner hereindescribed hereinbefore in connection with FIGS. 11 and 12. However, in this embodiment of the invention the Hall generators and pole pieces 304 and 306 are positioned a quadrant apart as illustrated in FIG. 14 and located in spaced relation. Here, as in FIGS. 11 and 12, the Hall generators can be contained within a housing or otherwise suitably mounted on support means, not shown.

A shaft 330 is coaxially and concentrically positioned between the Hall generators and the upper and lower pole pieces 304 and 306. An annular magnet 332 is positioned around the shaft 330 and pole pieces 334 and 336 engage the axial ends of the magnet 332 and the magnet and the pole pieces are operatively connected to shaft 330 for rotation therewith. If desired, suitable counterbalance weight means 338 can be connected to the pole pieces or operatively connected to the shaft 330 so that the shaft is balanced for the weight of the magnet and pole pieces. The pole pieces 334 and 336 are of size and dimension so that the radially outer portion thereof is positionable in close fitting engagement with upper and lower pole pieces 304 and 306 adjacent the Hall generator 290 and the circumferential dimension of the pole pieces 334 and 336 is such that the pole pieces are always in close relation to one of the series of upper and lower pole pieces adjacent the various Hall generators. While four of the Hall generators and upper and lower pole pieces have been shown in FIGS. 11–14, it will be understood that such illustrates an arrangement and the number of pole pieces and Hall generators that can be used for a four pole motor and that such can be varied depending upon the type of motor.

The signal generated by the Hall generators 290 when a magnetic field is passed therethrough is utilized in a suitable circuit to control flow of electrical energy to windings in a motor or the like or for other suitable switching functions. A typical circuit utilizing a Hall generator 290 is illustrated in FIG. 15 of the drawings, and includes an NPN transistor 340 and a PNP transistor 342. The base 344 of transistor 340 is electrically connected to the signal terminal 294 of the Hall generator and the base 346 of the transistor 342 is electrically connected to the signal terminal 296 of the Hall generator. The emitters 348 and 350 of transistors 340 and 342 are electrically connected to the bias input terminal 298 and bias output terminal 300, respectively, of the Hall generator, and the collectors 352 and 354 of transistors 340 and 342 are connectible to power input and output terminals 356 annd 358, respectively.

In operation, the leakage current through the transistors 340 and 342 provides the bias current for operation of the typical Hall generator. Passage of a magnetic flux or field through the Hall generator 290 in a plane normal to FIG. 15 of the drawings will cause a voltage to appear at the signal contacts or terminals 294 and 296. When the magnetic flux flows in one direction the voltage will be of a polarity which will turn on both of the transistors 340 and 342 to thereby cause induction through the transistors which in turn increases the bias current and such in turn increases the signal current applied to the bases of the transistors. This produces a regenerative action in which the current builds up rapidly through the contactor means to a maximum value, thereby causing saturation of the transistors for most efficient operation of the transistors. While this typical circuit utilizing the Hall generators has been shown, it will be understood that other circuits can also be utilized, if desired. The two transistors 340 and 342 shown in the drawings provide a balanced operation of the Hall generators.

Figure 16:
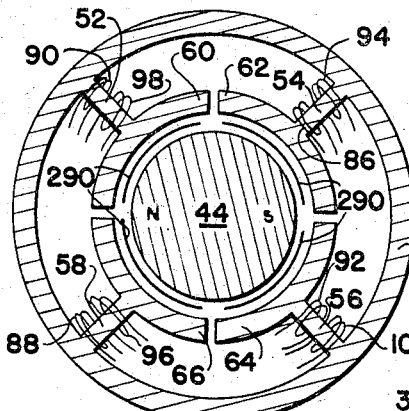
FIG. 16 is a transverse cross sectional view somewhat similar to FIG. 3 of the drawings illustrating a D.C. motor of the invention and showing the positioning of Hall generator means adjacent to the rotor of the motor.

FIG. 16 of the drawings illustrates a brushless D.C. motor utilizing a plurality of Hall generators 290 and in this instance the Hall generators 290 are positioned adjacent the permanent magnet 44. In FIG. 16 the same reference numerals are used to indicate the same or similar parts shown for the motor of FIGS. 1–3, the only difference in this modification being the utilization of the Hall generators and positioning of same. As a result of positioning of the Hall generators in FIG. 16 at least one of the generators always has a magnetic field therethrough in a direction normal to the plane of the wafer or flat thin element thereof which results in production of voltage at the signal terminals of the generator to result in closing of a circuit such as the circuit of FIG. 15 which can be used to provide electrical energy from a source of D.C. power to a conductor forming a winding in the motor, such as one of the armature windings of FIG. 16, which in turn creates a rotating magnetic field about the permanent magnet 44 to cause rotation thereof. As magnet 44 rotates, a magnetic flux from magnet 44 passes successively through the Hall generators to thereby affect the desired switching action which creates the rotating magnetic field for operation of the motor. Other than positioning of the Hall generators and connection of same to the various windings in the motor, the motor of FIG. 16 is the same or similar in construction to that of FIGS. 1–3.

Figure 17:
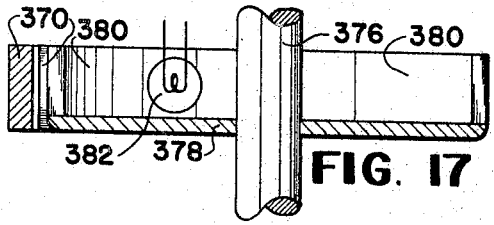
FIG. 17 is a transverse cross sectional view illustrating another preferred specific embodiment of the contactor means of the invention wherein photoelectric means are used in the contactor means.
Figure 18:
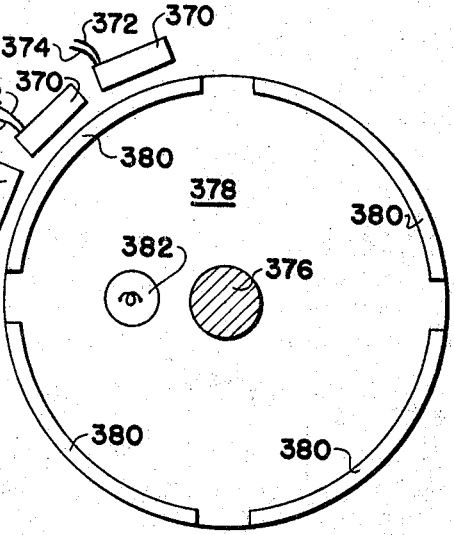
FIG. 18 is a plan view of the contactor means of FIG. 17.

FIGS. 17–20 illustrate still further preferred specific embodiments of the contactor means of the invention wherein photoelectric means are utilized and such are shown generally at 370. Four of the photoelectric means 370 are illustrated in FIG. 18 and are positioned in an arcuate path and in spaced relation to each other and each of the photoelectric means have two terminals to which conductors 372 and 374 are connected and the conductors 372 and 374 are connectible in an electric circuit with operation of the photoelectric means regulating or controlling the electric circuit. Means are provided to periodically provide light to each of the photoelectric means 370. For this purpose, a shaft 376 is provided and here as in other embodiments of the invention the shaft 376 can be a motor shaft or other shaft means. A shutter wheel 378 is operatively connected to the shaft 376 for rotation therewith and preferably the wheel 378 includes a plurality of circumferentially spaced and axially extending flanges or walls 380 with the flanges 380 being located between the shaft 376 and the photoelectric means 370. A light source 382 is provided and is connectible to a suitable source of energy and the light source 382 is preferably positioned between the shaft 276 and the walls or flanges 380 of the shutter wheel 378 so that rotation of shaft 376 and the shutter wheel 378 causes light from the light source passing between adjacent ones of the walls or flanges 380 to alternatively be directed onto the various ones of the photoelectric means 370 to thereby control operation of the photoelectric means so that they are alternately operated. The operation of the photoelectric means 370 is then utilized in an electric circuit to open and close same and control passage of electrical energy from a source of electrical energy to conductors or the like, such as to windings in one of the motors of the invention.

While the shutter wheel construction of FIGS. 17 and 18 shows four gaps or interruptions in the walls 380, it will be understood that the photoelectric means can be positioned in an annular manner surrounding shaft 376 and the wall 380 can be substantially continuous to provide only a single hole or opening through which the light from source 382 passes.

Figure 19:
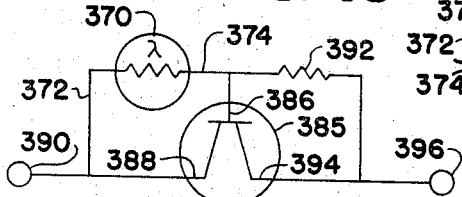
FIG. 19 is a diagrammatic view illustrating one manner of using the photoelectric means of FIGS. 17 and 18 for operation of an electrical circuit.

FIG. 19 of the drawings illustrates a circuit utilizing the photoelectric means 70. In this instance, the photoelectric means 370 is shown as being a photoresistor device which is constructed and adapted so that the resistance of the device 370 is a function of the light falling on the device. Thus, the amount of resistance in the circuit is variable in response to the amount of light received by the photoresistance device. A PNP transistor 385 is provided and the base 386 thereof is electrically connected to one terminal of the photoelectric device 370, such as by the conductor 374. The other terminal of the photoelectric device 370 is connectible by conductor 372 to the collector 388 of the transistor 385 and to a terminal 390 which can be a power output terminal and connectible to a conductor forming a winding of a motor or the like. The base 386 of transistor 385 and conductor 274 connected to the photoelectric device 370 is also connected to a resistor 392 which in turn is connected to the emitter 394 of transistor 385 and to a power input terminal 396. Thus, the amount of light received by the photoelectric device 370 varies the amount of resistance in the circuit shown in FIG. 19 to thereby control operation of the circuit and thus control the passage of electrical energy from the power input terminal 396 to the power output terminal 390 and thus the electrical energy supplied to a motor winding or the like. In the particular circuit illustrated in FIG. 19 the amount of light received by the device 370 causes the resistance of the device to decrease which thereby causes additional current to flow in the transistor for regulation of the circuit.

Figure 20:
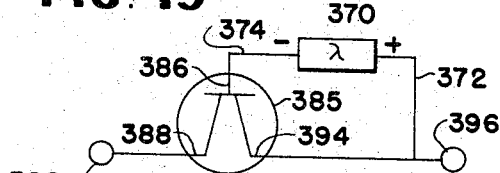
FIG. 20 is a diagrammatic view illustrating another preferred manner of utilizing the photoelectric means of FIGS. 17 and 18 in an electric circuit.

FIG. 20 of the drawings illustrates another circuit utilizing a photoelectric means 370 and in this instance the photoelectric means is a photogenerator device and is connected in the circuit so that the light falling on the device causes a voltage to be generated which causes additional conduction through the transistor. The device can be connected to a PNP transistor such as the transistor 385 and the connection between the elements of the circuit is illustrated in FIG. 20. The elements of the transistor 385 and the power input and output terminals have been numbered the same as in FIG. 19. The circuits of FIGS. 19 and 20 are merely illustrative of various control circuits which can utilize photoelectric devices 370 which are actuated by light directed thereon during operation of the shutter wheel. In addition, other means for interrupting light from the light source can be utilized, such as a various density disc which could be used to modulate and synchronize the light source, In addition, a plurality of lights could be utilized which are sequentially lit by rotating contactor means to provide the same result.

Figure 21:
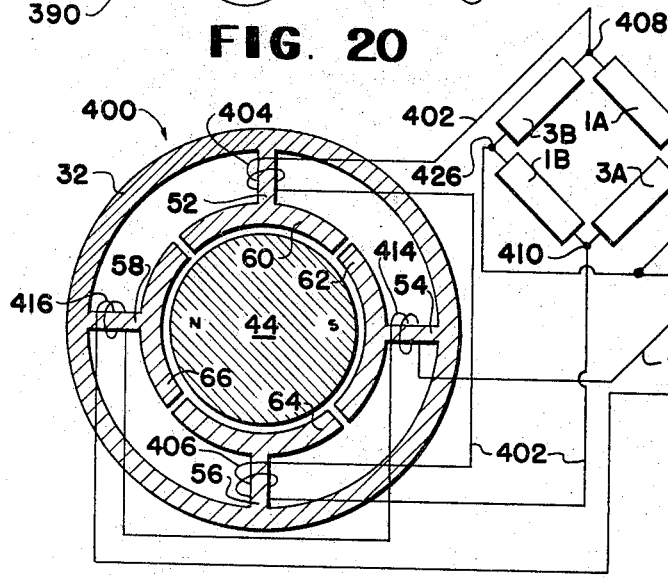
FIG. 21 is a diagrammatic view illustrating another preferred specific embodiment of a brushless D.C. motor of the invention utilizing contactor means in bridge circuits to obtain the electrical switching for providing a rotating magnetic field.

Another preferred specific embodiment of a brushless D.C. motor of the invention is shown diagrammatically in FIG. 21 and is indicated generally at 400. The motor 400 can have a housing, a rotor magnet, winding supports and the like which are the same or similar to like structures shown in FIGS. 1–3 and like reference numerals have been used in FIG. 21 to designate like or common parts. The motor of FIG. 21 utilizes somewhat more complicated contactor means in order to effect current reversal through conductors forming windings of the motor so that each conductor need only be wound on two opposed support members and each support member has only one conductor wound thereon, that is the use of double windings in the motors of FIGS. 1–3 and 16 have been eliminated and only one winding is provided on each of the supports. Thus, the additional complexity of the contactor means of FIG. 21 permits simplicity in the construction of the armature windings.

In the four pole motor illustrated in FIG. 21 a conductor 402 is provided and is wound on armature supports 52 and 56 to form windings or coils 404 and 406 and the ends of the wire 402 are connected to terminals 408 and 410 of a bridge circuit. Another conductor 412 is provided and is wound on supports 54 and 58 to form windings or coils 414 and 416, respectively. The ends of conductor 412 are connected to terminals 418 and 420 of another bridge circuit having contactor means to provide electrical switching. The first bridge circuit additionally includes terminals 424 and 426 which are connectible to terminals 428 and 430 of a source of D.C. power and terminals 430 and 432 of the second bridge circuit are also connected to the terminals 428 and 430 so that electrical energy is provided to both of the bridge circuits. The bridge circuits are both made up of contactor means and each bridge circuit can be a duplication of the various contactor means previously described which are operated in conjunction to provide the electrical switching functions to provide electrical energy from terminals 428 and 430 through the conductors 402 and 412 to provide a rotating magnetic field. Since only one winding is provided on each of the supports of the motor 400 the contactor means must provide for electrical reversing, that is for changing the direction of current flow through each of the conductors 402 and 412 to reverse the polarity of the individual windings of the motor and thus provide 360 degrees of electrical armature rotation. In other words, the contactor means are constructed and adapted so that the contactors shown at 1a and 1b in FIG. 21 are simultaneously energized or closed to permit the flow of current from terminal 424 through terminal 408 and conductor 402 to the coils 404 and 406 and then through terminal 410 and element 1b to terminal 426 and then to the return terminals 430 of the source of D.C. power. Next the members 2a and 2b of the other bridge circuit are activated to provide for current flow through contact 430, member 2a, terminals 418 and then through conductor 412 to provide energy to coils or windings 414 and 416 and subsequently through terminal 420 of the bridge circuit through portion 2b and from terminal 232 to the return terminal 430 of the source of D.C. power. Thus the magnetic field has rotated 90 degrees. In a similar manner the members 3a and 3b are subsequently closed which provides electrical energy through conductor 402 in a reverse direction from that previously described and thereafter members 4a and 4b are closed to provide energy to conductor 412 in the reverse direction to that previously described. Thus the magnetic field around the magnet 44 can be rotated through 360 degrees to provide for rotation of the rotor of the motor. While a clockwise rotation has been described, it will be apparent that the reverse can be obtained simply by reversing the left and right coils or windings of the various conductors.

Figure 22:
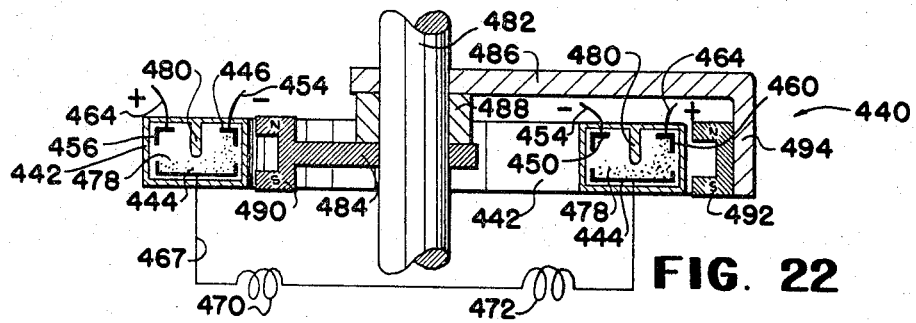
FIG. 22 is a transverse cross section view illustrating another preferred specific embodiment of contactor means of the invention.
Figure 23:
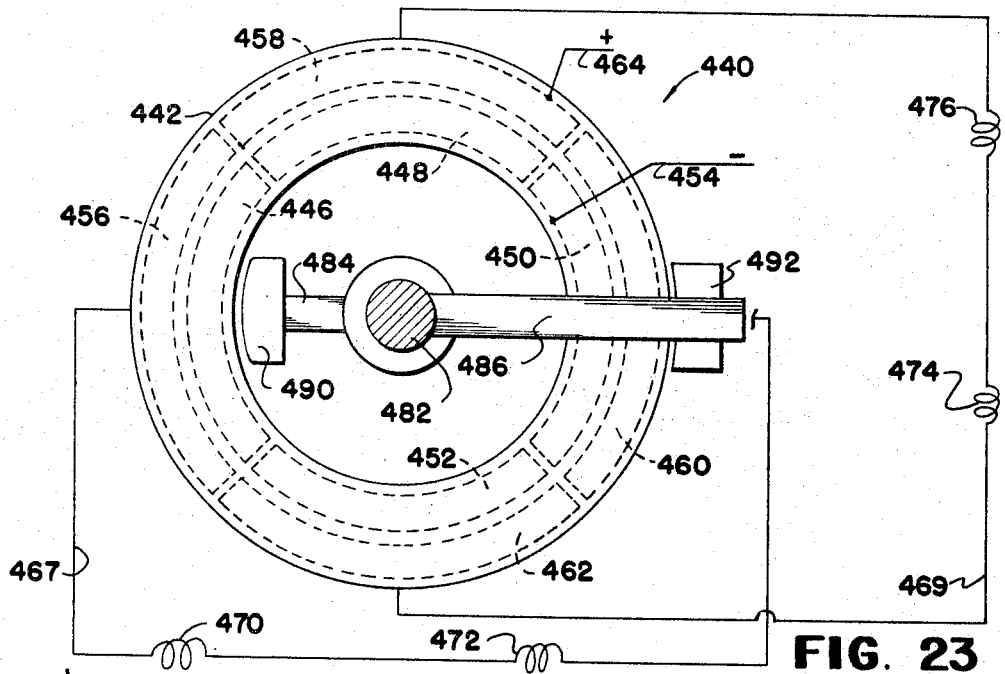
FIG. 23 is a plan view of the contactor means of FIG. 22.

FIGS. 22 and 23 of the drawings illustrate a preferred specific embodiment of contactor means of the invention which is particularly constructed and adapted for use with bridge type switching and is constructed so that a single contactor means can be utilized without duplicating the contactor structures previously described. The contactor means of FIGS. 22 and 23 is shown generally at 440 and includes an annular closed housing 442. An annular common electrical contact 444 is provided and is mounted on the inner surface of the bottom of the housing 442 and is somewhat similar in construction and mounting as the contact 164 of FIG. 4. A first set of four spaced individual contacts are positioned in the upper portion of the housing in spaced relation to each other and in spaced relation to the common contact 440 and the individual contacts 446, 448, 450 and 452 of the first set of contacts are preferably adjacent the radially inner wall of the housing 442 and are connectible to the negative terminal of a source of D.C. power or voltage, such as by a conductor 454 shown connected to the contact 450, it being understood that the individual ones of the contacts can be innerconnected electrically or directly connected to the D.C. source terminal by other conductors such as shown in 454.

A second set of four individual terminals 456, 458, 460 and 462 are provided in the upper portion of the housing in spaced relation to the first set of individual contacts and to the common contacts 444 and are preferably located adjacent the radially outer edge or wall of the housing 442 as best illustrated in the drawings in FIG. 22 and the individual contacts can be innerconnected or individually electrically connected by conductors such as shown in 464 to the positive terminal of a source of A.C. voltage. Suitable electrical conductors such as shown at 467 and 469 can be provided and connected electrically to the common conductor 444 with the ends of the individual conductors preferably being at diametrically opposite locations on the common contact 444 and intermediate portions of the conductors can form coils or windings for a motor such as shown at 470, 472, 474 and 476. The interior of the housing 442 is preferably provided with suitable means which are effected by a magnetic field to thereby close an electrical path between the sets of individual contacts and the common contact. For this purpose a powdered material, preferably a powdered metallic material such as iron or the like is provided and is positioned in the housing as shown at 478 and, if desired, a wall or divider 480 can also be provided and positioned between the first and second sets of individual contacts to prevent the iron particles 478 from forming an electrical path therebetween.

Means are provided to obtain a rotating magnetic field to the housing 472 for operation of the contactor means. For this purpose, a shaft 482 is provided and can be a motor shaft or a separately driven shaft and the shaft 482 is preferably concentrically mounted within the housing 472. Operatively connected to the shaft 482 are two arm members 484 and 486 which can be separated by a spacer member 488 and desirably the arm members 484 and 486 project from the shaft 482 in diametrically opposite directions as best illustrated in FIG. 23. A magnet 490 is connected to the radially outer end of the arm 484 and is positioned to be adjacent the radially inner wall of the housing 442 and another magnet 492 is connected to depending flange or bracket 494 on the arm 486 and the magnet 492 is located adjacent the radially outer wall of the housing 442.

In operation, the powdered iron or other material 478 in the housing 442 is effected by the magnetic field from magnets 490 and a portion of the material is displaced to form an electrical path between the individual contacts 446 for the first set of individual contacts to the common contact 444 and at the same time the magnet 492 displaces a portion of the material 478 to provide a path for electrical energy from the contact 460 to the common contact 444 and thereby complete an electrical circuit to a source of D.C. power through the contactor means and through coils or conductors connected to the common contact, such as the conductor 467 having the coils or windings 470 and 472 which can be motor windings for the motor of FIG. 21. When the shaft 482 is rotated 180 degrees to move the magnets 490 and 492 to a position diametrically opposite that shown in FIG. 22, then current flow through conductor 467 and the coils associated therewith will be reversed so that the magnetic poles formed by the windings 470 and 472 will be reversed. In the same manner electrical energy is provided through conductor 469 to the coils or windings associated therewith and current flow will be reversed in direction by rotation of the shaft 482. Thus, the single contactor means 440 shown in FIGS. 22 and 23 performs the function of two of the contactor means previously described and for this reason a single contactor 440 can be utilized to obtain the desirable bridge type switching functions for the motor of FIG. 21. While the housing 442 is shown as being annular in shape in FIGS. 22 and 23 it will be understood that the housing can be a semi-circle or even a quarter circle and the same switching function obtained by the use of additional magnets operatively connected to the shaft 482 in a manner somewhat similar to that previously described in connection by other embodiments of the invention.

Figure 24:
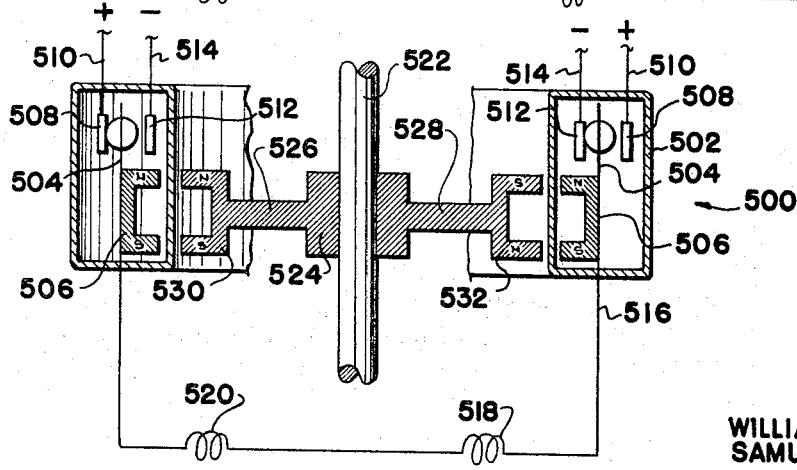

Another preferred specific embodiment of contactor means which are particularly constructed and adapted for providing the bridge type switching of contactor shown in FIG. 21 is illustrated in FIG. 24 and shown generally at 500. The contactor means 500 includes an annular closed housing 502 and a plurality of electrical contacts are mounted within the housing and arranged in sets or pairs. The electrical contacts include a plurality of movable contacts 504 which can be referred to as the common contacts of the contactor means and the movable contacts 504 are preferably provided with magnets, pole pieces or the like 506 and as illustrated in the drawings the magnets 506 are generally U-shaped and have the north poles at the top thereof. Also provided in the housing 502 are a plurality of individual contacts 508 which are preferably positioned in the upper portion of the housing and located at the radially outer portion thereof and such are connectible to a terminal of the source of D.C. power by conductors 510 and the conductors 510 may be interconnected if desired. Also in the upper portion of the housing is a plurality of contacts 512 which are positioned in spaced relation to the contacts 508 and are connectible by conductors 514 to the other terminal of a source of D.C. power.

The movable contacts 504 are connected to conductors such as shown at 516 and preferably diametrically opposite ones of the movable contacts 504 are connected to opposite ends of the same conductor. The conductors can be used for the windings of a D.C. motor or the like and windings are shown at 518 and 520 for the conductor 516. It will be understood that additional conductors and windings can be provided as required such as illustrated by the conductors 467 and 469 in FIG. 23.

A shaft 522 is concentrically positioned within the housing 502 and can be a motor shaft or other driven shaft. A magnet mounting member 524 is connectible to the shaft 522 for rotation therewith and arms 526 and 528 project outwardly from the mounting member 524 and are preferably located substantially diametrically opposite from each other. A generally U-shaped magnet 530 is connected to the radially outer end of the arm 526 and is preferably a U-shaped magnet and has the north pole at the top thereof and the south pole at the bottom thereof as shown in FIG. 24. Another magnet 532 is connected to the outermost end of arm 528 and is preferably generally U-shaped and has the south pole at the top thereof and the north pole at the bottom thereof. Thus, the magnets 530 and 532 are oppositely mounted. Both of the magnets are positioned to be adjacent the radially inner wall of the housing 502 so that rotation of the shaft 522 provides rotating magnetic fields through the housing which alternately attracts and repels the magnets 506 attached to the movable contacts 504 to make contact with both the inner and outer sets of fixed contacts and thus reverse current flow through the conductor 516.

As will be seen from FIG. 24 and assuming the magnets 530 and 532 are in the position illustrated, then the magnet 530 has the north pole thereof in direct alignment with the north pole of the magnet 506 on contact 504 adjacent thereto and such repels the magnet 506 and causes outward movement of the movable contacts 504 to place same into electrical engagement with the fixed contact 508. Simultaneously the magnet 532 which has the south pole thereof closely adjacent the north pole of the magnet 506 shown at the right side of FIG. 24 attracts the magnet 506 and causes radially inward movement of the movable contact 504 shown on the right side of FIG. 24 to thereby move the movable contact into engagement with the contact 512. Thus an electrical circuit is completed from conductor 510 through contact 508 and contact 504 and then through conductor 516 to the movable contact 504 on the right side of FIG. 24, and through contact 512 to the conductor 514. As the electrical energy flows through the conductor 516 it flows through windings 518 and 520 to thereby provide a magnetic field to the winding of a motor or the like. Assuming that the shaft 522 is rotated 180 degrees, then the reverse connections will take place, that is the movable contact 504 at the left side of FIG. 24 will be in engagement with the contact 512 and the movable contact 504 on the right side of FIG. 12 will be in engagement with the contact 508 to again complete the electrical circuit which this time flows in the reverse direction to thereby set up an opposite polarity in the windings 518 and 520. Any number of conductors 516 and windings can be provided to achieve the desired operation.

The contactor means of FIG. 24 provides for simultaneously opening and closing two contacts and is quite desirable for use with the D.C. motor as shown in FIG. 21 and performs the switching functions of the bridges in FIG. 21.

In each of the various embodiments of the invention a brushless D.C. motor or contactor means for use in connection with a D.C. motor or for other switching functions has been provided which eliminates undesirable sparking resulting from brushes in common D.C. motors. Each of the housings utilized with the contactor means can be completely closed or sealed so that they can be operated in an explosive atmosphere without danger and, in addition, the contactor means can be remotely mounted from the rotor and armature of the motor if desired to further insure no harmful effects from the sparking. The various contactor means described can be used directly to power a motor as in the case of smaller motors or such can be used to control a semi-conductor device or other power control amplifying means in the case of larger motors. Each of the various embodiments of the invention are applicable to a motor of any number of poles even though four pole motors and contactor means therefor have been shown in the drawings for convenience.

In each instance, operation of the various contactor means provide a self-starting operation. That is, the motor will develop substantial torque even from a standing start.

The permanent magnet rotor 44 described in the application can, of course, be replaced with a wound rotor and a set of commutator rings can be provided to obtain either a rotating shunt field or a rotating series field, depending on how the field is connected in relation with the stationary armature.

While the invention has been described in connection with preferred specific embodiments thereof, it will be understood that such is intended to illustrate and not to limit the scope of the invention which is defined by the claims.

We claim:
1. A brushless D.C. motor comprising, in combination, a motor housing having an elongated hollow cylindrical portion and two end plates mounted on opposite ends of said cylindrical portion and substantially closing same, bearing means mounted in said end plates, an elongated rotor including an elongated cylindrical permanent magnet coaxially positioned within said cylindrical portion of said housing and shaft means connected to the ends of said magnet and having end portions thereof rotatably mounted in said bearing means in said end plates, a stationary armature positioned within said cylindrical portion of said housing and surrounding said permanent magnet with said armature including four spaced supports with each of said supports extending longitudinally in said housing and being spaced a quadrant apart from adjacent ones of said supports, said armature further including four separate electrical conductors with each of said conductors being wound on two opposite ones of said supports and with each winding of each of said conductors being the reverse of the other winding thereof, and contactor means including a common contact and four spaced individual contacts with each of said individual contacts being electrically connected to one end of each of said conductors with said common contact and the other end of each of said conductors being electrically connectible to a source of D.C. voltage, and a quantity of powdered conductive magnetic material positioned in said housing and in contact with said common contact and normally in spaced relation to each of said individual contacts, said powdered material being positioned so that when in a magnetic field it provides a path for electrical energy between said common and individual contacts, said contactor means being mounted in said housing and having magnetic means operatively connected to said shaft, said magnetic means being movable adjacent said contacts and being operable to alternately close said individual contacts and said common contact to thereby provide D.C. voltage to said conductors in sequence so that D.C. voltage passing through said windings creates a rotating magnetic field about said permanent magnet of said rotor to thereby cause rotation of said permanent magnet and said shaft means.

2. A brushless D.C. motor comprising, in combination, a hollow motor housing, a magnet positioned in said housing, shaft means operatively connected to said magnet and being rotatably mounted in said housing, a stationary armature positioned in said housing and surrounding said magnet therein, said armature including a plurality of electrical conductors with said conductors being positioned to provide a plurality of circumferentially spaced magnetic poles when electric energy is passed through said conductors, and contactor means including a common contact and a plurality of individual contacts with each of said individual contacts being electrically connected to one end of said conductors and with said common contact and the other end of said conductors being connectible to a source of electrical energy, said contactor means having rotatable magnetic means movable adjacent to said contacts, and a quantity of powdered conductive magnetic material positioned in said housing and in contact with said common contact and normally in spaced relation to each of said individual contacts, said powdered material being influenced by the magnetic field of said rotatable magnetic means to close an electrical circuit between said common contact and said individual contacts and thereby complete an electric circuit to said conductors, said motor being constructed and adapted so that in operation rotation of said magnetic means of said contactor means operates said contactor means to alternately provide electric current to said conductors of said armature and thereby create a rotating magnetic field to cause rotation of said shaft and magnet.

3. Contactor means for closing circuits and alternately providing electrical energy to a plurality of conductors comprising, in combination, an elongated closed arcuate housing, an elongated common electrical contact mounted in said housing and extending substantially the entire length thereof, a plurality of individual contacts positioned in said housing in longitudinal spaced relation to each other and in transverse spaced relation to said common contact, each of said individual contacts being connectible to one end of separate conductors with the other end of each of said conductors and said common contact being connectible to a source of electrical energy, a quantity of powdered conductive magnetic material positioned in said housing and in contact with said common contact and normally in spaced relation to each of said individual contacts, said powdered material being influenced by a magnetic field with said powdered material being positioned to provide a path for the passage of electrical energy between said common contact and said individual contacts when in a magnetic field, a rotatable shaft, magnetic means operatively connected to said shaft for rotation therewith, said magnetic means and said shaft being mounted and positioned so that rotation of said shaft moves said magnetic means in an arcuate path adjacent said housing to thereby provide a magnetic field to said housing and said powdered material thereby provides an electrical path between said common contact and the one of said individual contacts adjacent said magnetic means on said shaft, said contactor means being constructed and adapted so that said shaft can be rotated to provide a rotating magnetic field adjacent said magnetic means operatively connected to said shaft to thereby alternately close an electrical circuit between said common contact and said individual contacts to thereby regulate passage of electrical current to said conductors when connected to said individual contacts.

4. Contactor means comprising, in combination, a shaft, an annular permanent magnet, two spaced flat pole pieces engaging opposite end faces of said magnet and projecting radially therefrom with said magnet and said pole pieces being operatively connected to said shaft for rotation therewith, each of said pole pieces having four radially projecting arms positioned approximately 90 degrees apart and with said arms of one of said pole pieces being axially in line with said arms of the other of said pole pieces, an elongated closed arcuate housing positioned adjacent the ends of said arms of said pole pieces with said housing and said pole pieces being positioned relative to each other so that said pole pieces provide a magnetic field transversely through said housings, an elongated common electrical contact positioned in said housing and extending substantially the entire length of said housing, four spaced individual electrical contacts positioned in said housing in spaced relation to said common contact, and a quantity of powdered iron positioned in said housing in contact with said common contact and normally being in spaced relation to said individual contacts so that movement of said arms of said pole pieces adjacent said housing creates a rotating magnetic field in said housing extending from said common contact to said individual contacts to thereby cause movement of said powered iron in said field to a position between and in engagement with said individual contacts and said common contact to thereby alternately close an electric circuit between said individual contacts and said common contact.

5. Contactor means for closing circuits and alternately providing electrical energy to a plurality of conductors comprising, in combination, an elongated closed arcuate housing, an elongated common electrical contact mounted in a lower portion of said housing and extending substantially the entire length thereof, a plurality of individual electrical contacts positioned in an upper portion of said housing in longitudinal spaced relation to each other and in transverse spaced relation to said common contact, each of said individual contacts being connectible to one end of separate conductors with the other end of each of said conductors and said common contact being connectible to a source of electrical energy, a quantity of powdered iron positioned in said housing in engagement with said common contact and normally being in spaced relation to said individual contacts, a shaft, magnet mounting means operatively connected to said shaft and including a portion connected to said shaft and an arm connected in one end portion to said portion connected to said shaft and projecting radially outwardly from said shaft, a U-shaped permanent magnet secured to the outer end portion of said arm and having the north and south poles thereof positioned in axially spaced relation with said magnet being adjacent said housing with one pole thereof being movable along the outer surface of said housing adjacent said common contact with the other pole thereof being movable along said housing adjacent said individual contacts to thereby provide a rotating magnetic field through said housing between said common contact and said individual contacts to thereby cause displacement of said powdered iron in said housing to provide a continuous path between said common contact and said individual contacts so that movement of said magnet with said shaft alternately closes an electrical circuit between said common contacts and separate ones of said individual contacts.

6. Contactor means for closing circuits and alternately providing electrical energy to conductors comprising, in combination, an annular closed housing, an annular common electrical contact mounted in said housing on the bottom thereof and extending the entire length thereof, a first set of four spaced individual contacts positioned in the upper portion of said housing in spaced relation to each other and in spaced relation to said common contact with said first set of individual contacts being adjacent the radially inner wall of said housing, and a second set of four individual contacts positioned in said upper portion of said housing in spaced relation to each other and to said common contact and said first set of individual contacts with said second set of individual contacts being adjacent the radially outer wall of said housing, each of said individual contacts of said sets of contacts extending approximately a quadrant of the length of said housing, electrical conductor means having the ends thereof connected to said common contact with said conductor means being positionable in a motor housing or the like to provide a magnetic field therein, said sets of individual contacts being connectible to a source of D.C. energy, a shaft coaxially positioned within said housing, two arm members connected to said shaft and projecting in diametrically opposite directions therefrom, a first magnet connected to one of said arm members and positioned adjacent said radially inner wall of said housing, a second magnet connected to the outermost end of the other of said arm members and positioned adjacent the radially outer wall of said housing, and a quantity of powdered iron positioned in said housing and being movable by a magnetic field passing through said housing from said bottom thereof to said top thereof to cause displacement of said powdered iron to thereby provide the path for electrical energy from said common contact to said sets of individual contacts, said contactor means being constructed and adapted so that rotation of said shaft causes movement of said magnets to thereby provide a magnetic field through the radially inner and radially outer portions of said housing to thereby provide a path for passage of electrical energy from said source of electrical energy through said individual contacts and said common contacts and through said electrical conductor means.

References Cited
UNITED STATES PATENTS

| | | | |
|---|---|---|---|
| 1,530,936 | 3/1925 | Greenwood | 200—19 |
| 2,421,983 | 6/1947 | Bently | 200—6 |
| 2,492,435 | 12/1949 | Ostline | 318—254 |
| 2,538,216 | 1/1951 | Stehlik | 310—46 |
| 2,558,540 | 6/1951 | Clos | 310—46 |
| 2,668,884 | 2/1954 | Jacobs | 200—87 |
| 2,790,124 | 4/1957 | Eisele | 310—49 |
| 2,972,029 | 2/1961 | Ovshinsky | 200—87 |
| 3,077,555 | 2/1963 | Fredrickson | 318—254 |
| 3,187,244 | 6/1965 | Summerer | 200—19 X |
| 3,210,631 | 10/1965 | Niccolls | 318—138 |
| 3,239,738 | 3/1966 | Welch | 310—49 |

FOREIGN PATENTS

| | | |
|---|---|---|
| 1,244,994 | 9/1960 | France. |
| 520,540 | 3/1931 | Germany. |

BENJAMIN DOBECK, *Primary Examiner.*